US005994706A

United States Patent [19]
Allen et al.

[11] Patent Number: 5,994,706

[45] **Date of Patent: *Nov. 30, 1999**

[54] ARTICLE IRRADIATION SYSTEM IN WHICH ARTICLE-TRANSPORTING CONVEYOR IS CLOSELY ENCOMPASSED BY SHIELDING MATERIAL

[75] Inventors: John Thomas Allen; George Michael Sullivan, Jr., both of San Diego, Calif.; Michael Scott Brazell, Pine, Colo.; Harrold Brook Knowles, El Sobrante, Calif.; Anthony Alexander Zante, Fremont, Calif.; Richard Joseph Mendonsa, Dublin, Calif.; Richard Clarke Miller, Castro Valley, Calif.; Kenneth Whitham, Alamo, Calif.

[73] Assignee: Titan Corporation, San Diego, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/854,202

[22] Filed: May 9, 1997

[51] Int. Cl.[6] .................................................... G01N 21/00

[52] U.S. Cl. ................................ 250/454.11; 250/453.11

[58] Field of Search ......................... 250/453.11, 454.11, 250/492.3, 515.1; 378/69

[56] References Cited

U.S. PATENT DOCUMENTS

| | | | |
|---|---|---|---|
| 3,224,562 | 12/1965 | Bailey et al. | 250/453.11 |
| 3,396,273 | 8/1968 | Brunner | 250/454.11 |
| 3,452,195 | 6/1969 | Brunner | 250/454.11 |
| 3,560,745 | 2/1971 | Peterwen et al. | 250/492.1 |
| 3,564,241 | 2/1971 | Ludwig | 250/454.11 |
| 3,676,673 | 7/1972 | Coleman | 250/453.11 |
| 4,013,261 | 3/1977 | Steigerwald et al. | 250/453.11 |
| 5,096,553 | 3/1992 | Ross et al. | 250/453.11 |
| 5,396,071 | 3/1995 | Atwell et al. | 250/359.1 |
| 5,396,074 | 3/1995 | Peck et al. | 250/453.11 |
| 5,400,382 | 3/1995 | Welt et al. | 250/454.11 |

*Primary Examiner*—Bruce C. Anderson
*Attorney, Agent, or Firm*—Ellsworth R. Roston; Fulwider, Patton, et al.

[57] ABSTRACT

An article irradiation system includes a radiation source for scanning a target region with radiation; a first conveyor system for transporting articles from a loading area though the target region to an unloading area; and radiation shielding material defining a tunnel closely encompassing portions of the conveyor system extending away from the target region toward the loading and unloading areas for shielding the loading and unloading areas from radiation derived from the radiation source. The first conveyor system is disposed in a path having curved turns of such degree between the target region and the loading and unloading areas that the closely encompassing radiation shielding material precludes a direct line of sight between the target region and the loading and unloading areas and thereby facilitates a compact embodiment in which the first conveyor system may be included in an assembly line. A second conveyor system is coupled to the first conveyor system for transporting the articles from a first position on the first conveyor system that is past the target region and at which the path of the first conveyor system has a given alignment to a second position on the first conveyor system that is before the target region and at which the path of the first conveyor system has an alignment that is one-hundred-and-eighty degrees different than the given alignment to thereby reorient the articles transported by the first conveyor system by one-hundred-and-eighty degrees with respect to the path of the first conveyor system for retransportation through the target region. In a radiation shielding assembly having a radiation shield defining a corridor through which the electron beam is scanned and further defining a tunnel through which articles may be transported through the target region, a beam stop is disposed within a recess in a portion of the radiation shield on the opposite side of the target region from the radiation source so that photons emitted from the beam stop toward the radiation source but obliquely thereto are inhibited from entering the tunnel by such portion the radiation shield.

37 Claims, 3 Drawing Sheets

FIG. 1
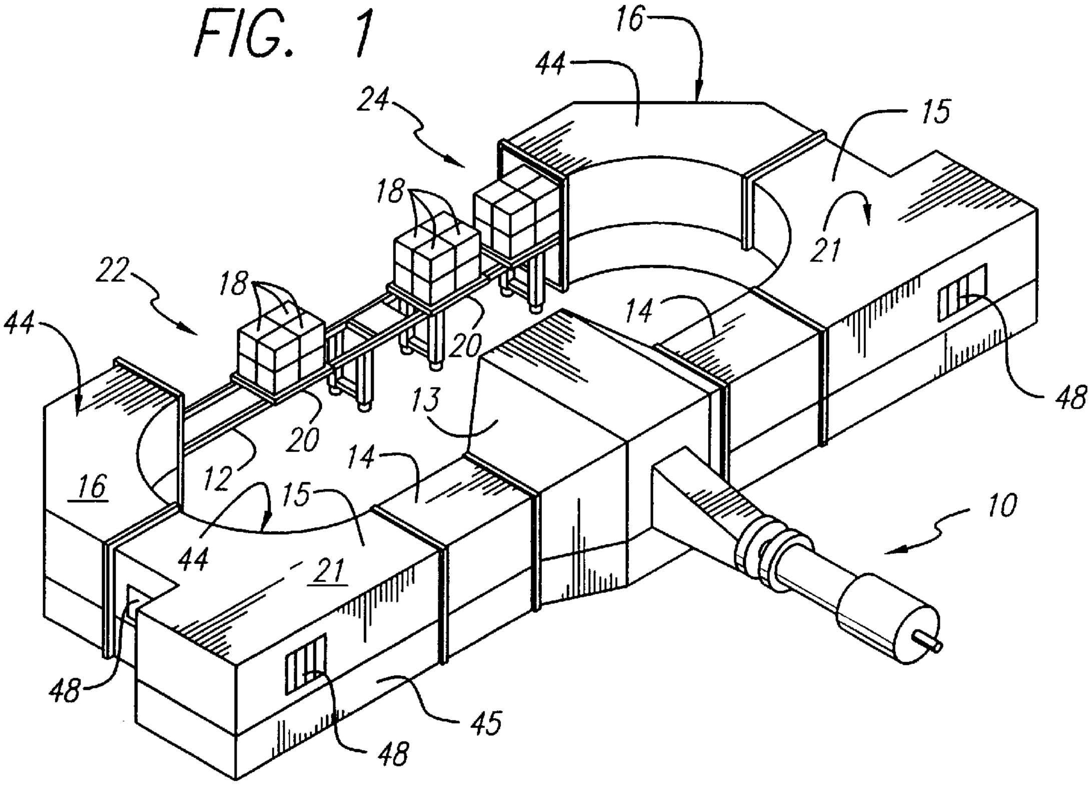
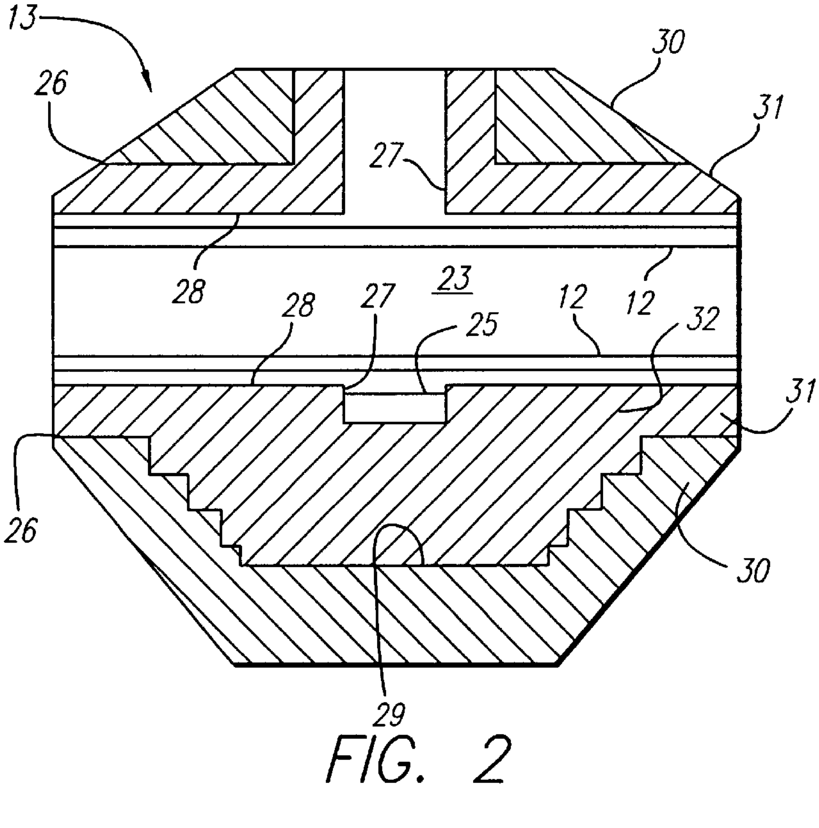
FIG. 2

ARTICLE IRRADIATION SYSTEM IN WHICH ARTICLE-TRANSPORTING CONVEYOR IS CLOSELY ENCOMPASSED BY SHIELDING MATERIAL

BACKGROUND OF THE INVENTION

The present invention generally pertains to irradiation systems that utilize a conveyor system for transporting articles through a target region scanned by radiation from a radiation source and is particularly directed to (a) an improvement in shielding the loading and unloading areas of such an irradiation system from radiation derived from the radiation source and (b) an improvement in reorienting the articles for retransportation through the target region in order to enable the articles to be irradiated from opposite sides.

A prior art irradiation system that utilizes a conveyor system for transporting articles through a target region is described in U.S. Pat. No. 5,396,074 to Peck et al. In such prior art system, the radiation source and the conveyor system are disposed in a room having concrete walls, wherein such concrete walls and additional concrete walls defining an angled passageway to the room shield loading and unloading areas located outside of the room from radiation derived from the radiation source.

A system for reorienting the articles for retransportation through the target region also is described in U.S. Pat. No. 5,396,074 to Peck et al. Such reorienting system is quite complex in that it includes a gear rack disposed adjacent a reroute conveyor system that transports the articles from a position on a primary conveyor system located past the target region in the direction of movement of the primary conveyor system to a position on the primary conveyor system located before the target region in such direction of movement, and a rotatable collar mechanism on an article carrier, wherein the rotatable collar mechanism interacts with the gear rack in such a manner as the article carrier is being transported past the rack by the reroute conveyor system as to reorient the article carrier by 180 degrees.

SUMMARY OF THE INVENTION

In a first aspect, the present invention provides an article irradiation system, comprising a radiation source positioned for scanning a target region with radiation; a conveyor system for transporting articles from a loading area through the target region to an unloading area; and radiation shielding material defining a tunnel closely encompassing portions of the conveyor system extending away from the target region toward the loading and unloading areas; wherein the conveyor system is disposed in a path having turns closely encompassed by the radiation shielding material and of such degree between the target region and the loading and/or unloading areas that the radiation shielding material closely encompassing said turns precludes a direct line of sight between the target region and the loading area and/or a direct line of sight between the target region and the unloading area for thereby shielding the loading and/or unloading areas from radiation derived from the radiation source; wherein the closely encompassed turns are curved; wherein adjacent the outside portions of said curved turns that are within a direct line of sight from the target region, the radiation shielding material is not as close to the path of the conveyor system as the radiation shielding material adjacent the inside of said curved turns and the radiation shielding material is thicker than the radiation shielding material adjacent the inside of said curved turns; and wherein the thicker radiation shielding material adjacent the outside portions of said curved turns that are within a direct line of sight from the target region extends in a much thicker corner portion to a far point at a right angle from radiation shielding material that extends in a straight line to the target region, and from said far point the radiation shielding material extends at a right angle from the much thicker corner portion toward the path of the conveyor system.

In a second aspect, the present invention further provides an article irradiation system, comprising a radiation source positioned for scanning a target region with radiation; a first conveyor system for transporting articles from a loading area through the target region to an unloading area, with the first conveyor system being disposed in a closed-loop path; and a second conveyor system coupled to the first conveyor system for transporting the articles from a first position on the first conveyor system that is past the target region and at which the path of the first conveyor system has a given alignment to a second position on the first conveyor system that is before the target region and at which the path of the first conveyor system has an alignment that is one-hundred-and-eighty degrees different than the given alignment to thereby reorient the articles transported by the first conveyor system by one-hundred-and-eighty degrees with respect to the path of the first conveyor system for retransportation through the target region. This second aspect of the present invention provides a relatively simple system for reorienting the articles for retransportation through the target region in the above-described compact, closed-loop embodiment of the irradiation system having radiation shielding material closely encompassing portions of the first conveyor system according the first aspect of the present invention.

For example, in an embodiment in which the path of the first conveyor system has four turns and a straight segment between each pair of adjacent turns, with the target region being within a first said straight segment, the loading and unloading areas being adjacent a second said straight segment on the opposite side of the loop from the first straight segment, the first position on the first conveyor system being in a third said straight segment that is between the two turns of the loop that are between the target region and the unloading area, and the second position on the first conveyor system being in a fourth said straight segment that is between the two turns of the loop that are between the target region and the loading area, the second conveyor system may be so simple as to merely define a straight path from the first position on the first conveyor system to the second position on the first conveyor system.

In a third aspect, the present invention provides a set of shielding modules for use in an article irradiation system that includes a radiation source positioned for scanning a target region with radiation and a conveyor system for transporting articles through the target region, wherein individual modules comprise radiation shielding material defining a tunnel for closely encompassing a portion of the conveyor system; wherein at least some of the modules are curved for respectively encompassing segments of the conveyor system having an arc of curvature that is an integer divisor of ninety degrees.

In a fourth aspect, the present invention provides a radiation shielding assembly for use in an irradiation system that includes an electron beam radiation source positioned for scanning articles disposed in a target region with an electron beam, comprising a beam stop of material for absorbing electrons and for converting the energy of the absorbed electrons into photons that are emitted from the beam stop, wherein the beam stop is disposed on the opposite side of the target region from the radiation source; and a radiation shield for absorbing radiation while inhibiting emission of neutrons beyond the shielding assembly, wherein the radiation shield defines a corridor through which the electron beam is scanned for irradiating articles disposed in the target region and further defines a tunnel through which articles may be transported to and from the target region; wherein the beam stop is disposed within a recess in a portion of the radiation shield that defines a portion of the corridor on the opposite side of the target region from the radiation source so that photons emitted from the beam stop toward the radiation source but obliquely thereto are inhibited from entering the tunnel by said portion the radiation shield.

Additional features of the present invention are described with reference to the detailed description of the preferred embodiments.

BRIEF DESCRIPTION OF THE DRAWING

FIG. 1 illustrates a preferred embodiment of an irradiation system according to the present invention.

FIG. 2 is a diagram of the interior of a preferred embodiment of a radiation shielding assembly included in the irradiation system of FIG. 1.

DETAILED DESCRIPTION

Figure 3:
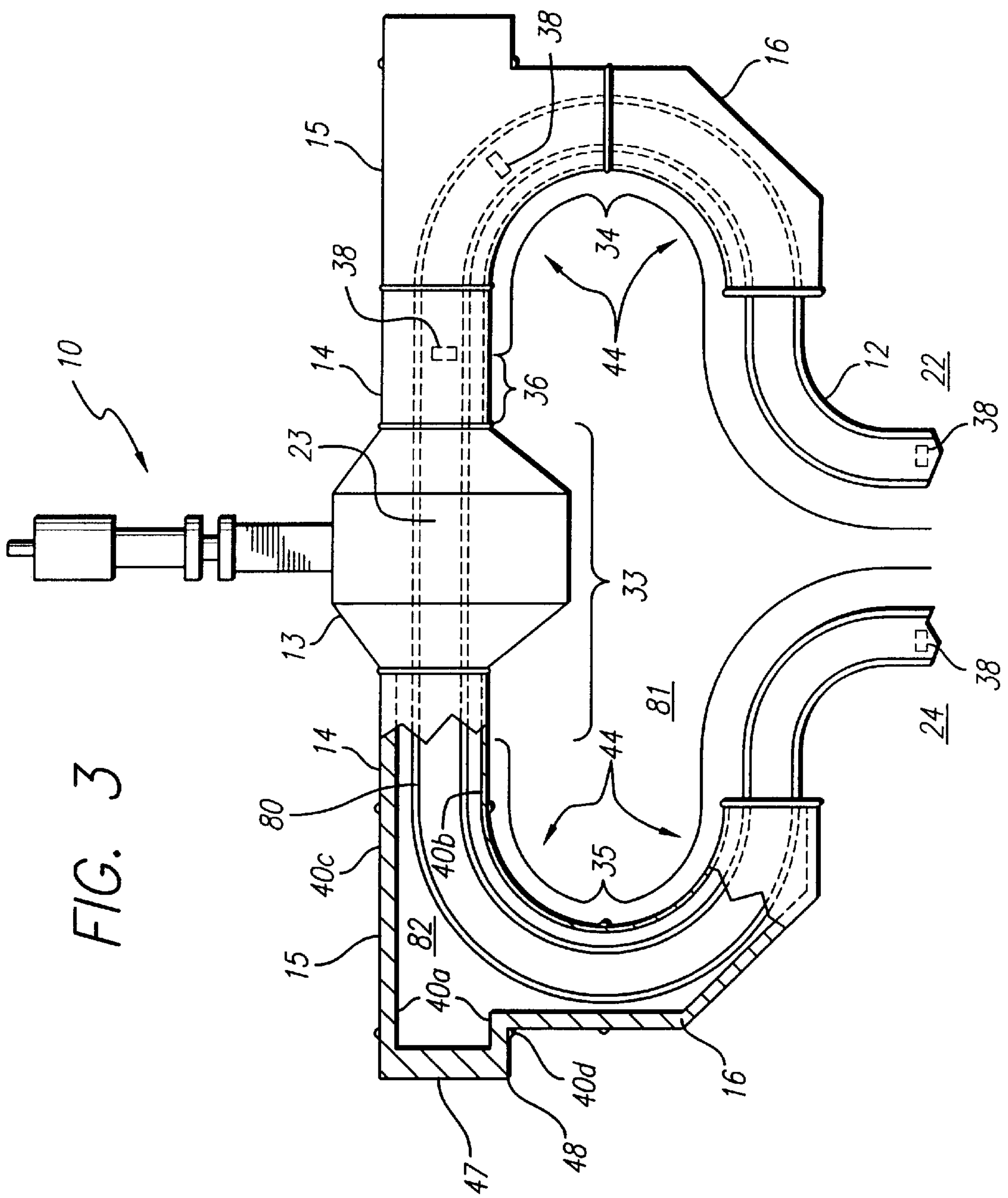
FIG. 3 is a diagram showing a modified embodiment of the irradiation system of FIG. 1 included within an assembly line; in which diagram portions of the radiation shielding modules are broken away to show the disposition of the radiation shielding material therein in relation to the conveyor system. In the portions of the diagram of FIG. 3 in which portions of the radiation shielding modules are not broken away the portions of the conveyor system encompassed by radiation shielding material are shown by dashed lines.

Referring to FIGS. 1, 2 and 3, a preferred embodiment of an irradiation system according to the present invention includes a radiation source 10, a conveyor system 12, a radiation shielding assembly 13, a pair of straight-section radiation shielding modules 14 respectively having one end sealed to opposite ends of the radiation shielding assembly 13, a first pair of corner-section radiation shielding modules 15 respectively having one end sealed to the other ends of the straight-section radiation shielding modules 14 and a second pair of corner-section radiation shielding modules 16 respectively having one end sealed to the other ends of the first pair of corner-section radiation shielding modules 15. Articles 18 carried by article carriers 20 are transported by the conveyor system 12 in a direction indicated by the arrows 21 from a loading area 22 through a target region 23 to an unloading area 24. The radiation source 10 is positioned for scanning the target region 23 with radiation;

The radiation source 10 preferably is a 10-million-electron-volt linear accelerator having an electron accelerating wave guide that provides an electron beam for irradiating articles 18 transported through the target region 23 by the conveyor system 12 The radiation source 10 is disposed along an approximately horizontal axis outside a loop defined by the path of the conveyor system 12 and scans the articles 18 with an electron beam at a given rate in a plane perpendicular to the direction of transport by the conveyor system 12. The scanning height and the current of the electron beam are adjusted in accordance with the height and radiation absorption characteristics of the articles being scanned. The scanning of the articles 18 by the electron beam is further controlled as described in the above-referenced U.S. Pat. No. 5,396,074. The accelerator is located inside a removable shield and protected from ionizing radiation and ozone by interior walls. In alternative embodiments, the radiation source scans the articles with a type of radiation other than an electron beam, such as X-rays.

Referring to FIG. 2, the radiation shielding assembly 13 includes a beam stop 25 and a radiation shield 26. The radiation shield 26 includes material for absorbing radiation while inhibiting emission of neutrons beyond the shielding assembly 13. The radiation shield 26 defines a corridor 27 through which the electron beam is scanned for irradiating articles 18 disposed in the target region 23 and further defines a tunnel 28 through which articles 18 may be transported by the conveyor system 12 to and from the target region 23. The portion of the radiation shield 26 defining the tunnel 28 closely encompasses the conveyor system 12.

The beam stop 25 is disposed on the opposite side of the target region 23 from the radiation source 10 and includes a material, such as aluminum, for absorbing electrons and for converting the energy of the absorbed electrons into photons that are emitted from the beam stop 25. The beam stop is disposed within a recess 29 in a portion of the radiation shield 26 that defines a portion of the corridor 27 on the opposite side of the target region 23 from the radiation source 10 so that photons emitted from the beam stop 25 toward the radiation source 10 but obliquely thereto are inhibited from entering the tunnel 28 by such portion the radiation shield 26.

The radiation shield 26 includes a layer of lead 30 for absorbing the emitted gamma-rays and a layer of cadmium-free iron 31 disposed between the lead 30 and the corridor 27 for reducing the intensity of the emitted photons so that photons entering the lead 30 from the iron 31 are absorbed by the lead 30 and do not cause neutrons to be emitted from the lead 30. The iron 31 is disposed within a recess 32 within the lead 30 in the portion of the radiation shield 26 that is on the opposite side of the target region 23 from the radiation source 10 so that photons emitted from the iron 31 toward the radiation source 10 but obliquely thereto are inhibited from entering the tunnel 28 by the lead 30 in such portion of the radiation shield 26. Both the lead portion 30 and the iron portion 31 of the radiation shield 26 are readily constructed with a plurality of plates of various dimensions having a thickness in a range of approximately three to six inches, a width in a range of approximately two to four feet and a length in a range of approximately two to six feet. In one alternative embodiment (not shown) the radiation shield 26 includes a much thicker layer of cadmium-free iron and does not include any lead.

In another alternative embodiment (not shown), the radiation shield 26 includes concrete for absorbing the emitted photons with the concrete replacing the lead 30 and the iron 31 in the space on the opposite side of the target region 23 from the radiation source 10 and extending toward the loading area 22 and the unloading area 24 by such distances and in such directions as are required to provide adequate shielding of the loading area 22 and the unloading area 24 from radiation derived from the radiation source 10.

The conveyor system 12 is a chain conveyor system constructed of Bosch TS 3 Modular Conveyor components available from Bosch Automation Products, Buchanan, Mich. The article carriers 20 are Bosch workpiece pallets.

An embodiment of the irradiation system of the present invention in which the conveyor system 12 is included within an assembly line is shown in FIG. 3. In one such embodiment, the loading area 22 is a packaging area of the assembly line and the unloading area 24 is a boxing area of the assembly line. In another such embodiment, the loading area 22 is a boxing area of the assembly line and the unloading area 24 is the end of the assembly line from which the boxed articles 11 are removed for shipping.

Still referring to FIG. 3, the conveyor system 12 includes a process conveyor section 33 an inbound transport conveyor section 34, an outbound transport conveyor section 35 and a closing conveyor section 36, all of which are independently powered. The process conveyor section 33 transports the article carriers 20 though the target region 23 at a first speed. The first inbound conveyor section 34 transports the article carriers 20 from the loading area 22 to the closing conveyor section 36 at a second speed that differs from the first speed. The closing conveyor section 36 transports the article carriers 20 from the inbound transport conveyor section 34 to the processor conveyor section 33 at a speed that is varied during such transport in such a manner that the article carriers 20 are so positioned on the process conveyor section 33 that there is a predetermined separation distance between adjacent positioned article carriers 20. The closing conveyor section 36 transports the article carriers 20 at the speed of the process conveyor section 33 when the closing conveyor section 36 positions the article carrier 20 on the processor conveyor section 33. The variable speed of the closing conveyor section 36 is controlled as described in the above-referenced U.S. Pat. No. 5,396,074.

The outbound transport conveyor section 35 transports the article carriers 20 from the process conveyor section 33 to the unloading area 24 at a speed that may be the same as or different from the second speed of the inbound transport conveyor section 34. When the conveyor system 12 defines a closed loop, as shown in FIG. 1, the inbound transport conveyor section 34 and the outbound transport conveyor section 35 may be combined into a single transport conveyor section that is driven at the second speed, or the inbound transport conveyor section 34 and the outbound transport conveyor section 35 may be driven separately at respective speeds that may be the same or different.

Stop gates 38 are disposed at selected positions within the conveyor system 12, including before the closing conveyor section 36, in the loading area 22, in the unloading area 24, and within the inbound transport conveyor section 34 as shown, for queuing and traffic management of the article carriers 20.

Figure 4:
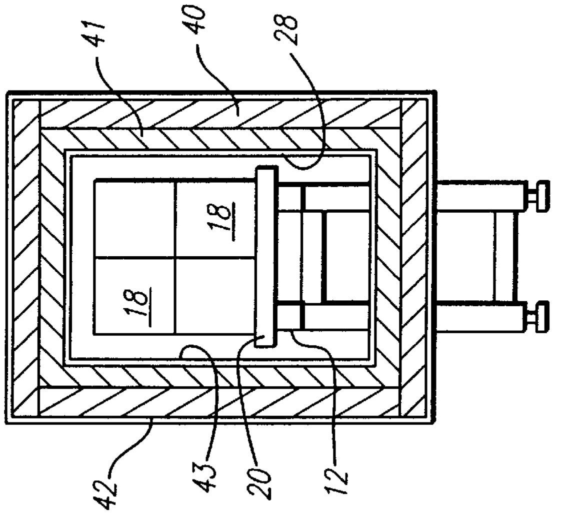
FIG. 4 is an end view of a preferred embodiment of a radiation shielding module according to the present invention included in the irradiation system of FIGS. 1 and 3 encompassing a portion of the conveyor system.

Referring to FIG. 4, the radiation shielding modules 14, 15, 16 include radiation shielding material, such as an outer layer of lead 40 surrounding an inner layer of cadmium-free iron 41, within a stainless-steel container 42. The exposed inner surface of the iron layer 41 is covered with stainless-steel sheets 43. In an alternative embodiment (not shown) the radiation shielding modules 14, 15, 16 include a much thicker layer of cadmium-free iron and do not include any lead. The radiation shielding material 40, 41 within the radiation shielding modules 14, 15, 16 define extensions of the tunnel 28 and closely encompass the portions of the conveyor system 12 that extend away from the target region 23 toward the loading area 22 and the unloading area 24. The radiation shielding modules 14, 15, 16 have adequate interior height to enable a reasonable quantity of articles 18 to be stacked upon an article carrier 20. The radiation shielding modules 14, 15, 16 do not extend all the way to the floor upon which the conveyor system 12 is supported. A skirt 45 extends between the bottoms of the radiation shielding modules 14, 15, 16 and the floor, as shown in FIG. 1.

Referring to FIG. 1, individual radiation shielding modules 14, 15, 16 respectively include at least one section that is movable, such as a door 48, for enabling access to the portion of the conveyor system 12 that is encompassed by the respective radiation shielding module 14, 15, 16.

Referring further to FIGS. 1 and 3, the conveyor system 12 is disposed in a path having curved turns 44 that are closely encompassed by the radiation shielding material 40, 41 within the shielding modules 14 and are of such degree between the target region 23 and the loading and unloading areas 22, 24 that the radiation shielding material 40, 41 closely encompassing the turns 44 precludes a direct line of sight between the target region 23 and the loading area 22 and a direct line of sight between the target region 23 and the unloading area 24, for thereby shielding the loading and unloading areas 22, 24 from radiation derived from the radiation source 10. The closely encompassing radiation shielding material 40, 41 is so configured between the target region 23 and the loading and unloading areas 22, 24 that radiation emanating from the target region 23 bounces off of the closely encompassing shielding material 40, 41 at least three times without there being a direct line of sight between a second bounce site and the loading area 22 or the unloading area 24.

The path of the conveyor system 12 extends from the loading area 22 to the curved turns 44 at the right end of FIG. 3, then extends along the curved turns 44 at the right end of FIG. 3, then extends in a straight segment or portion 80 between the curved turns at the right and left ends of FIG. 3, then extends along the curved turns 44 at the left end of FIG. 3 and then extends from the curved turn 44 at the left end of FIG. 3 to the unloading area 24 in FIG. 3. This path defines a loop (which may actually be considered to constitute a single loop). There is space within this path as indicated at 81. There is radiation shielding material 40*b* in this space. There is also space outside of this path as indicated at 82. The radiation shielding materials 40*a*, 40*c* and 40*d* define the limits of the space 82 outside of this path.

By disposing the conveyor system 12 in a path having curved turns 44 (a) the turns 44 may be and are of a continuous elevation so that lift-transverse units are not required in order to transport the article carriers 20 through such turns 44; and (b) elongated articles (not shown) extending beyond the front and/or rear of an article carrier 18 can transported through a turn 44 that is closely encompassed by the radiation shielding material 40, 41

At least some of the modules 16 are curved for respectively encompassing segments of the conveyor system 12 having an arc of curvature that is an integer divisor of ninety degrees. In the embodiment of FIGS. 1 and 3 having two 180-degree turns 44 separated by straight segments, the second pair of corner-section shielding modules 16 are curved for encompassing 90-degree segments of the conveyor system 12.

In the portions of the first pair of corner-section shielding modules 15 that are adjacent the outside portions of the curved turns 44 of the conveyor system 12 that are within a direct line of sight from the target region 23, the radiation shielding material 40*a* is not as close to the path of the conveyor system 12 as the radiation shielding material 40*b* adjacent the inside of such curved turns 44 and the radiation shielding material 40*a* is thicker than the radiation shielding material 40*b* adjacent the inside of the curved turns 44. The thicker radiation shielding material 40*a* adjacent the outside portions of the curved turns 44 that is within a direct line of sight from the target region 23 extends in a much thicker corner portion 47 to a far point 48 at a right angle from the radiation shielding material 40*c* that extends in a straight line to the target region 23. From the far point 48, the radiation shielding material 40*d* extends at a right angle from the much thicker corner portion 47 toward the path of the conveyor system 12. Although only the reference numerals 40*a,* 40*b,* 40*c* and 40*d* are used above in relation to the radiation shielding material adjacent the curved turns 44 within the first pair of corner-section radiation shielding modules 15, it is to be understood that the radiation shielding material 40*a,* 40*b,* 40*c* and 40*d* within the first pair of corner-section radiation shielding modules 15 includes both a layer of lead 40 and a layer of iron 41 as shown in FIG. 4.

In the portions of the first pair of corner-section shielding modules 15 that are adjacent the inside portions of the curved turns 44, the radiation shielding material 40*b* has approximately the same degree of curvature as the curved turns 44 in order to enhance dispersal of radiation reflected from the radiation shielding material 40*b* adjacent the outside portions of the curved turns 44 that are within a direct line of sight from the target region 23.

Figure 5:
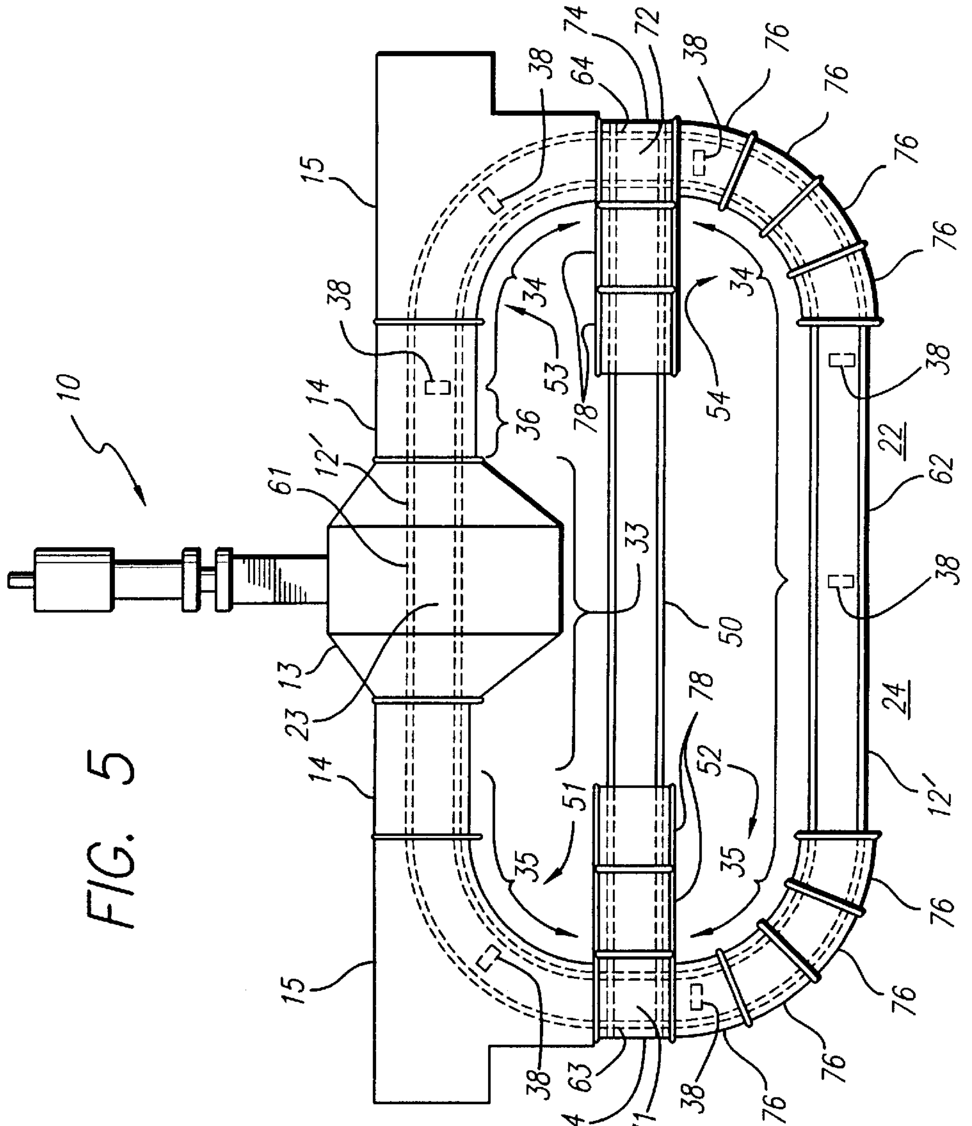
FIG. 5 is a diagram of an alternative preferred embodiment of an irradiation system according to the present invention, in which diagram the portions of the conveyor system encompassed by radiation shielding material are shown by dashed lines.

Referring to FIG. 5, in another preferred embodiment for use when it is necessary to reorient the article carriers 20 by 180 degrees for retransportation through the target region 23 to thereby enable the articles 18 to be irradiated from opposite sides, the irradiation system of the present invention includes a first conveyor system 12' for transporting the article carriers 20 through the target region 23 and a second conveyor system 50 coupled to the first conveyor system 12' for reorienting the article carriers 20 by 180 degrees with respect to the path of the first conveyor system 121 for retransportation through the target region 23.

The path of the first conveyor system 12' defines a closed loop having four curved ninety-degree turns 51, 52, 53, 54 and a straight segment 61, 62, 63, 64 between each pair of adjacent turns. The target region 23 is within a first straight segment 61; the loading and unloading areas 22, 24 are in a common unshielded area adjacent a second straight segment 62 on the opposite side of the loop from the first straight segment 61; the third straight segment 63 is between the two turns 51, 52 of the loop that are between the target region 23 and the unloading area 24; and the fourth straight segment 64 is between the two turns 53, 54 of the loop that are between the target region 23 and the loading area 22.

The second conveyor system 50 defines a straight path from a first position 71 in the third said straight segment 63 of the first conveyor system 12', that is past the target region 23 and at which first position 71 the path of the first conveyor system 12' has a given alignment, to a second position 72 in the fourth said straight segment 64 of the first conveyor system 12' that is before the target region 23 and at which second position 72 the path of the first conveyor system 12' has an alignment that is one-hundred-and-eighty degrees different than the given alignment. The first conveyor system 12' includes lift-transverse units at the first and second positions 71, 72 for effecting transfer of the article carriers 20 between the first conveyor system 12' and the second conveyor system 50.

By transporting the article carriers 20 from the first position 71 on the first conveyor system 12' to the second position 72 on the first conveyor system 12' the second conveyor system 50 reorients the articles 18 transported by the first conveyor system 12' by one-hundred-and-eighty degrees with respect to the path of the first conveyor system 12' for retransportation through the target region 23.

The conveyor system 12' in the embodiment of FIG. 5 also includes a process conveyor section 33 an inbound transport conveyor section 34, an outbound transport conveyor section 35 and a closing conveyor section 36, which operate in the same manner as described with reference to the embodiment of FIG. 3.

The conveyor system 12' in the embodiment of FIG. 5 further includes stop gates 38' before the closing conveyor section 36, in the loading area 22, in the unloading area 24, and within the inbound transport conveyor section 34, the outbound transport conveyor section 35 and the second conveyor system 50, as shown, for queuing and traffic management of the article carriers 20.

The embodiment of the irradiation system shown in FIG. 5 also includes an radiation shielding assembly 13, a first pair of straight-section radiation shielding modules 14 respectively having one end sealed to opposite ends of the radiation shielding assembly 13, a first pair of corner-section radiation shielding modules 15 respectively having one end sealed to the other ends of the straight-section radiation shielding modules 14, as in the embodiment of FIGS. 1, 2 and 3, a second pair of straight radiation shielding modules 74 respectively having one end sealed to the other ends of the first pair of corner-section radiation shielding modules 15; a pair of sets of seriatim-sealed curved radiation shielding modules 76 sealed respectively to the other ends of the second pair of straight-section radiation shielding modules 74 and a pair of sets of seriatim-sealed straight radiation shielding modules 78 sealed respectively to the sides of the second pair of straight radiation shielding modules 74 that are adjacent the second conveyor system 50.

The curved shielding modules 76 are substantially similar to the second pair of curved corner-section shielding modules 16 shown in FIG. 3, except that the individual curved shielding modules 76 encompass shorter segments of the first conveyor system 12' than the segments of the first conveyor system 12 encompassed by the respective second pair of curved corner-section shielding modules 16 in the embodiments of FIGS. 1 and 3. The radiation shielding modules 14, 15, 74, 76, 78 include radiation shielding material disposed in the same manner as shown in FIG. 4, except that in the second pair of straight radiation shielding modules 74, the side thereof that is sealed to an adjacent straight radiation module 78 encompassing a portion of the second conveyor system 50 has an opening into the adjacent straight radiation module 78. The radiation shielding material within the radiation shielding modules 14, 15, 74, 76 define extensions of the tunnel 28 and closely encompass the portions of the first conveyor system 12' that extend away from the target region 23 toward the loading and unloading areas, 22, 24, including the turns 51, 52, 53, 54, in order to preclude a direct line of sight between the target region 23 and the loading area 22 and a direct line of sight between the target region 23 and the unloading area 24.

The radiation shielding material within the sets of seriatim-sealed straight radiation shielding modules 78 define tunnels branching off from the tunnel 28 and closely encompass those portions of the second conveyor system 50 that are adjacent the first and second positions 71, 72 of the first conveyor system 12' where the second conveyor system 50 is coupled to the first conveyor system 12' to thereby shield the loading and unloading areas 22, 24 from radiation derived from the radiation source 10. The interior side walls of the straight radiation shielding modules 78 may be a greater distance from the second conveyor system 50 than the interior side walls of the curved radiation shielding modules 76 are from the first conveyor system 12' in order to accommodate elongated articles extending beyond the front and/or rear of an article carrier 18

The curved radiation shielding modules 76 respectively encompass twenty-two-and-one-half-degree segments of two of the ninety-degree turns 52, 54 of the first conveyor system 12'. The individual curved radiation shielding modules 76 encompass approximately uniform-length segments of the first conveyor system 12'. The individual straight radiation shielding modules 78 encompass approximately uniform-length segments of the second conveyor system 50. In alternative embodiments, the curved shielding modules 76 encompass thirty-degree, forty-five-degree or ninety-degree segments of the two ninety-degree turns 52, 54 of the first conveyor system 12'. For turns 44, 52, 54 of the respective conveyor systems 12, 12' that are integer multiples of m degrees, the radiation shielding material 40, 41 may be disposed within a plurality of curved radiation shielding modules 16, 76 that respectively encompass m-degree segments of the turns.

In other respects the irradiation system of FIG. 5 is substantially the same as the irradiation systems of FIGS. 1 and 3.

Shielding modules having an arc of curvature of less than ninety degrees are particularly useful for encompassing turns of conveyor systems that are other than ninety degrees. Although shielding modules having an arc of curvature of less than ninety degrees are more readily handled during assembly and disassembly of the irradiation system, shielding modules having a ninety-degree curvature usually are preferred because fewer shielding modules are thereby required in the overall irradiation system, whereby there are fewer sealed joints between the radiation shielding modules.

In an alternative embodiment, the radiation source 10 is disposed along an approximately vertical axis for scanning articles 18 transported through the target region 23 by the process conveyor section 33 and the radiation shielding assembly 13 is disposed about such vertical axis.

The dimensions of the various components of the radiation shielding assembly 13, and of the respective radiations shielding modules 14, 15, 16, 74, 75 at different locations within the irradiation system are determined by computer-aided modeling in accordance with a technique described in a manual entitled "MCNP—A General Monte Carlo Code for Neutron and Photon Transport" published by the Radiation Shielding Information Center, P.O. Box 2008, Oak Ridge, Tenn. 37831.

The advantages specifically stated herein do not necessarily apply to every conceivable embodiment of the present invention. Further, such stated advantages of the present invention are only examples and should not be construed as the only advantages of the present invention.

While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents.

We claim:

1. An article irradiation system, comprising a radiation source positioned for scanning a target region with radiation;

a conveyor system for transporting articles from a loading area through the target region to an unloading area; and radiation shielding material defining a tunnel closely encompassing portions of the conveyor system extending away from the target region toward the loading and unloading areas;

wherein the conveyor system is disposed in a path having turns closely encompassed by the radiation shielding material and of such degree between the target region and the loading and/or unloading areas that the radiation shielding material closely encompassing said turns precludes a direct line of sight between the target region and the loading area and/or a direct line of sight between the target region and the unloading area for thereby shielding the loading and/or unloading areas from radiation derived from the radiation source;

wherein the closely encompassed turns are curved;

wherein adjacent the outside portions of said curved turns that are within a direct line of sight from the target region the radiation shielding material is not as close to the path of the conveyor system as the radiation shielding material adjacent the inside of said curved turns and the radiation shielding material is thicker than the radiation shielding material adjacent the inside of said curved turns; and wherein the thicker radiation shielding material adjacent the outside portions of said curved turns that are within a direct line of sight from the target region extends in a much thicker corner portion to a far point at a right angle from radiation shielding material that extends in a straight line to the target region, and from said far point the radiation shielding material extends at a right angle from the much thicker corner portion toward the path of the conveyor system.

2. A system according to claim 1, wherein adjacent the inside portions of said curved turns the radiation shielding material has approximately the same degree of curvature as said curved turns in order to enhance dispersal of radiation reflected from the radiation shielding material adjacent the outside portions of said curved turns that are within a direct line of sight from the target region.

3. An article irradiation system, comprising a radiation source positioned for scanning a target region with radiation;

a conveyor system for transporting articles from a loading area through the target region to an unloading area; and radiation shielding material defining a tunnel closely encompassing portions of the conveyor system extending away from the target region toward the loading and unloading areas;

wherein the conveyor system is disposed in a path having turns closely encompassed by the radiation shielding material and of such degree between the target region and the loading and/or unloading areas that the radiation shielding material closely encompassing said turns precludes a direct line of sight between the target region and the loading area and/or a direct line of sight between the target region and the unloading area for thereby shielding the loading and/or unloading areas from radiation derived from the radiation source;

wherein the closely encompassed turns are curved; and wherein the turns are integer multiples of m degrees and the radiation shielding material is disposed within a plurality of curved modules that respectively encompass m-degree segments of said turns.

4. An article irradiation system comprising a radiation source positioned for scanning a target region with radiation;

a conveyor system for transporting articles from a loading area through the target region to an unloading area; and radiation shielding material defining a tunnel closely encompassing portions of the conveyor system extending away from the target region toward the loading and unloading areas;

wherein the conveyor system is disposed in a path having turns closely encompassed by the radiation shielding material and of such degree between the target region and the loading and/or unloading areas that the radiation shielding material closely encompassing said turns precludes a direct line of sight between the target region and the loading area and/or a direct line of sight between the target region and the unloading area for thereby shielding the loading and/or unloading areas from radiation derived from the radiation source; and wherein the radiation source is an electron beam source, further comprising a radiation shielding assembly disposed adjacent the target region, comprising a beam stop of material for absorbing electrons and for converting the energy of the absorbed electrons into photons that are emitted from the beam stop, wherein the beam stop is disposed on the opposite side of the target region from the radiation source; and a radiation shield for absorbing radiation while inhibiting emission of neutrons beyond the shielding assembly, wherein the radiation shield defines a corridor through which the electron beam is scanned for irradiating articles disposed in the target region and further defines a tunnel through which articles may be transported to and from the target region;

wherein the beam stop is recessed within a portion of the radiation shield that defines a portion of the corridor on the opposite side of the target region from the radiation source so that photons emitted from the beam stop toward the radiation source but obliquely thereto are inhibited from entering the tunnel by said portion the radiation shield.

5. A radiation shielding assembly according to claim 4, wherein the radiation shield includes a layer of lead for absorbing the emitted photons and a layer of cadmium-free iron disposed between the lead and the corridor for reducing the intensity of the emitted photons so that photons entering the lead from the iron are absorbed by the lead and do not cause neutrons to be emitted from the lead.

6. A radiation shielding assembly according to claim 5, wherein the iron is recessed within the lead in the portion of the radiation shield that is on the opposite side of the target region from the radiation source so that photons emitted from the iron toward the radiation source but obliquely thereto are inhibited from entering the tunnel by the lead in said portion the radiation shield.

7. A radiation shielding assembly according to claim 4, wherein the radiation shield includes concrete for absorbing the emitted photons.

8. An article irradiation system comprising a radiation source positioned for scanning a target region with radiation;

a conveyor system for transporting articles from a loading area through the target region to an unloading area; and radiation shielding material defining a tunnel closely encompassing portions of the conveyor system extending away from the target region toward the loading and unloading areas;

wherein the conveyor system is disposed in a path having turns closely encompassed by the radiation shielding material and of such degree between the target region and the loading and/or unloading areas that the radiation shielding material closely encompassing said turns precludes a direct line of sight between the target region and the loading area and/or a direct line of sight between the target region and the unloading area for thereby shielding the loading and/or unloading areas from radiation derived from the radiation source;

wherein the loading area and the unloading area are within a common unshielded area and the path of the conveyor system defines a closed loop past the loading area and the unloading area;

wherein the radiation source is disposed outside the loop on the opposite side of the loop from the common unshielded area; and wherein the radiation source is an electron beam source, the system further comprising a radiation shielding assembly disposed adjacent the target region, comprising a beam stop of material for absorbing electrons and for converting the energy of the absorbed electrons into photons that are emitted from the beam stop, wherein the beam stop is disposed on the opposite side of the target region from the radiation source; and a radiation shield including concrete for absorbing the emitted photons while inhibiting emission of neutrons beyond the shielding assembly, wherein the radiation shield defines a corridor through which the electron beam is scanned for irradiating articles disposed in the target region and further defines a tunnel through which articles may be transported to and from the target region;

wherein the beam stop is recessed within a portion of the radiation shield that defines a portion of the corridor on the opposite side of the target region from the radiation source so that photons emitted from the beam stop toward the radiation source but obliquely thereto are inhibited from entering the tunnel by said portion the radiation shield.

9. An article irradiation system, comprising a radiation source positioned for scanning a target region with radiation;

a first conveyor system for transporting articles from a loading area through the target region to an unloading area; and radiation shielding material defining a tunnel closely encompassing portions of the first conveyor system extending away from the target region toward the loading and unloading areas;

wherein the first conveyor system is disposed in a path having turns closely encompassed by the radiation shielding material and of such degree between the target region and the loading and/or unloading areas that the radiation shielding material closely encompassing said turns precludes a direct line of sight between the target region and the loading area and/or a direct line of sight between the target region and the unloading area for thereby shielding the loading and/or unloading areas from radiation derived from the radiation source;

further comprising a second conveyor system coupled to the first conveyor system for transporting the articles from a first position on the first conveyor system that is past the target region and at which the path of the first conveyor system has a given alignment to a second position on the first conveyor system that is before the target region and at which the path of the first conveyor system has an alignment that is one-hundred-and-eighty degrees different than the given alignment to thereby reorient the articles transported by the first conveyor system by one-hundred-and-eighty degrees with respect to the path of the first conveyor system for retransportation through the target region.

10. A system according to claim 9, wherein the path of the first conveyor system defines a closed loop having four turns and a straight segment between each pair of adjacent turns, with the target region being within a first said straight segment, the loading and unloading areas being adjacent a second said straight segment on the opposite side of the loop from the first straight segment, the first position on the first conveyor system being in a third said straight segment that is between the two turns of the loop that are between the target region and the unloading area, the second position on the first conveyor system being in a fourth said straight segment that is between the two turns of the loop that are between the target region and the loading area, and the second conveyor system defining a straight path from the first position on the first conveyor system to the second position on the first conveyor system in a substantially perpendicular relationship to the third and fourth straight segments of the first conveyor system.

11. A system according to claim 10, further comprising radiation shielding material defining tunnels closely encompassing at least those portions of the second conveyor system adjacent where the second conveyor system is coupled to the first conveyor system.

12. An article irradiation system, comprising a radiation source positioned for scanning a target region with radiation;

a loading area displaced from the radiation source, an unloading area displaced from the radiation source and the loading area, a first conveyor system for transporting articles from the loading area through the target region to the unloading area, with the first conveyor system being disposed in a loop; and there being on the first conveyor system a first position which is past the target region and at which the path of the first conveyor system has a given alignment with a second position on the first conveyor system, the second position on the first conveyor system being before the target region and having a second alignment that is 180° different than the given alignment, a second conveyor system coupled to the first conveyor system at the first and second positions of the first conveyor position to provide the rotation of the articles through the angle of 180° from the given alignment to the second alignment, and radiation shielding material disposed relative to the first conveyor system for preventing radiation from the source from reaching the loading area and the unloading area.

13. A system according to claim 12, wherein the path of the first conveyor system defines a closed loop having four turns and a straight segment between each pair of adjacent turns, with the target region being in a first one of the straight segments, the loading and unloading areas being adjacent a second one of the straight segments on the opposite side of the loop from the first straight segment, the first position on the first conveyor system being in a third one of the straight segments that is between the two turns of the loop that are between the target region and the unloading area, the second position on the first conveyor system being in a fourth one of the straight segments that is between the two turns of the loop that are between the target region and the loading area, and the second conveyor system defining a straight path from the first position on the first conveyor system to the second position on the first conveyor system in a substantially perpendicular relationship to the third and fourth straight segments of the first conveyor system.

14. A set of shielding modules for use in an article irradiation system that includes a radiation source positioned for scanning a target region with radiation and a conveyor system for transporting articles through the target region, wherein individual modules comprise radiation shielding material defining a tunnel for closely encompassing a portion of the conveyor system;

wherein at least some of the modules are curved for respectively encompassing segments of the conveyor system having an arc of curvature that is an integer divisor of ninety degrees.

15. A set of modules according to claim 14, wherein some of the modules are straight for respectively encompassing straight segments of the conveyor system.

16. A radiation shielding assembly for use in an irradiation system that includes an electron beam radiation source positioned for scanning articles disposed in a target region with an electron beam, comprising a beam stop of material for absorbing electrons and for converting the energy of the absorbed electrons into photons that are emitted from the beam stop, wherein the beam stop is disposed on the opposite side of the target region from the radiation source; and a radiation shield for absorbing radiation while inhibiting emission of neutrons beyond the shielding assembly, wherein the radiation shield defines a corridor through which the electron beam is scanned for irradiating articles disposed in the target region and further defines a tunnel through which articles may be transported to and from the target region;

wherein the beam stop is disposed within a recess in a portion of the radiation shield that defines a portion of the corridor on the opposite side of the target region from the radiation source so that gamma-rays emitted from the beam stop toward the radiation source but obliquely thereto are inhibited from entering the tunnel by said portion of the radiation shield.

17. A radiation shielding assembly according to claim 16, wherein the radiation shield includes a layer of lead for absorbing the emitted photons and a layer of cadmium-free iron disposed between the lead and the corridor for reducing the intensity of the emitted photons so that photons entering the lead from the iron are absorbed by the lead and do not cause neutrons to be emitted from the lead.

18. A radiation shielding assembly according to claim 17, wherein the iron is recessed within the lead in the portion of the radiation shield that is on the opposite side of the target region from the radiation source so that photons emitted from the iron toward the radiation source but obliquely thereto are inhibited from entering the tunnel by the lead in said portion the radiation shield.

19. A radiation shielding assembly according to claim 16, wherein the radiation shield includes concrete for absorbing the emitted photons.

20. A system for irradiating articles, including, a target region, a radiation source positioned for scanning the target region, a loading area, an unloading area, a conveyor system for transporting articles in a loop from the loading area through the target region to the unloading area, and radiation shielding material defining a tunnel which encompasses portions of the conveyor system that extend in the loop from the target region toward the loading and unloading areas, the tunnel defined by the radiation shielding material at positions displaced from the target region in directions toward the loading area, and toward the unloading area, being curved to preclude a direct line of sight between the target region and each of the loading and unloading areas and thereby shield the loading and unloading areas from radiation derived from the radiation source wherein there is space inside, and space outside of the loop defining the conveyor system and wherein the curved portions of the radiation shielding material are thicker in the space outside of the loop defining the conveyor system than in the space inside of the loop defining the conveyor system.

21. An irradiating system as set forth in claim 20 wherein the radiation source is selected from a group consisting of an electron beam source and an X-ray source and wherein the loading and the unloading areas do not have any radiation shielding material.

22. A system for irradiating articles, including:

a radiation source constructed to provide radiation, a loading area displaced from the radiation source, an unloading area displaced from the radiation source and the loading area, a conveyor system movable in a looped path from the loading area past the radiation source to the unloading area and constructed to carry the articles past the source for an irradiation of the articles by the source, the path having a configuration curved at portions displaced from one another, and radiation shielding material enveloping, and following the looped path of, the conveyor system in the movement of the conveyor system between the radiation source and a position approaching the unloading area to prevent radiation from the source from reaching the unloading area, the configuration of the looped path of movement of the conveyor system defining straight portions between the curved portions to cooperate with the curved portions in preventing radiation from the source from reaching the unloading area wherein the looped path of the radiation shielding material has an inside and an outside and wherein the radiation shielding material is thicker at the outside of the looped path than at the inside of the looped path and the unloading area is free of radiation shielding material.

23. An irradiating system as set forth in claim 22 wherein the looped path of the radiation shielding material has a first peripheral surface inside of the loop and a second peripheral surface outside of the loop and wherein the looped path of the radiation shielding material is closer to the conveyor system at the first peripheral surface than at the second peripheral surface.

24. A system for irradiating articles, including:

a radiation source constructed to provide radiation, a loading area displaced from the radiation source, an unloading area, a conveyor system movable in a looped path from the loading area past the radiation source to the unloading area and constructed to carry the articles past the radiation source for an irradiation of the articles by the source, the path having a configuration curved at positions displaced from one another, and radiation shielding material enveloping, and following the configuration of the looped path of the conveyor system, including the curved configurations at the positions displaced from one another, between the radiation source and a position approaching the loading area to prevent radiation from the source from reaching the loading area, wherein the looped path of the radiation shielding material has an inside and an outside and wherein the radiation shielding material is thicker at the outside of the looped path than at the inside of the looped path and the loading area is free of radiation shielding material.

25. A system for irradiating articles having a first side and a second side opposite the first side, including:

a radiation source constructed to provide radiation, a first conveyor system movable in a loop past the radiation source and constructed to carry the articles past the source for the irradiation of the first side of the articles by the source, the loop having opposite sides and having opposite ends between the opposite sides, and a second conveyor system having a path extending between the opposite sides of the loop at positions between the opposite ends of the loop and having an alignment relative to the first conveyor system for providing for a movement of the articles by the first conveyor system past the radiation source for the irradiation of the second side of the articles by the radiation source, a loading area disposed relative to the first conveyor system to provide articles to the first conveyor system, an unloading area disposed relative to the first conveyor system to receive articles from the first conveyor system, and radiation shielding material disposed relative to the first conveyor system for isolating the loading and unloading areas from radiation from the source.

26. An irradiating system as set forth in claim 25 wherein the loop includes curved portions and straight portions between the curved portions and wherein the path of the second conveyor system extends between straight portions at the opposite sides of the loop at the positions between the opposite ends of the loop.

27. An irradiating system as set forth in claim 25 wherein the loop includes curved portions and radiation shielding material is disposed in the curved portions of the loop and wherein radiation shielding material is additionally disposed in the path in the second conveyor system between the opposite sides of the loop.

28. An irradiating system as set forth in claim 25 wherein the path of the second conveyor system is straight and includes modules at the opposite ends of the path and wherein the modules include radiation shielding material disposed to define a tunnel for the movement of the articles through the tunnel by the second conveyor system.

29. A system for irradiating articles having first and second opposite sides, including, a radiation source constructed to provide radiation, a first conveyor system movable in a single loop past the radiation source and constructed to carry the articles past the source for an irradiation of the first side of the articles by the source, a second conveyor system having a path disposed within the single loop and having opposite ends and communicating at its opposite ends with the single loop and having an alignment and construction relative to the first conveyor system for providing for the movement of the articles by the first conveyor system past the radiation source for an irradiation of the second side of the articles by the source, a loading area disposed relative to the first conveyor system to provide articles to the first conveyor system, an unloading area disposed relative to the first conveyor system to receive articles from the first conveyor system, and radiation shielding material disposed relative to the first conveyor system for isolating the loading and unloading areas from the source.

30. An irradiating system as set forth in claim 29 wherein the single loop has curved portions and straight portions between the curved portions and wherein the radiation shielding material is disposed within the single loop and outside of the single loop at progressive positions in the curved portions and straight portions of the single loop and wherein the radiation shielding material is disposed within the single loop in the path of the second conveyor system.

31. An irradiating system as set forth in claim 30 wherein the path of the second conveyor system is straight and includes modules at the opposite ends of the path and wherein the modules include radiation shielding material disposed within the single loop to define a tunnel for the movement of the articles by the second conveyor system through the tunnel.

32. A method of irradiating articles, including the steps of:

providing a radiation source at a particular elevation, providing at the particular elevation a loading area displaced from the radiation source, providing at the particular elevation an unloading area displaced from the radiation source, providing a conveyor system at the particular elevation, the conveyor system being disposed in a single loop in which each position in the loop is continuous with the adjacent positions in the loop to provide for an uninterrupted movement of the articles at the particular elevation from the loading area past the radiation source to the unloading area, providing for the uninterrupted movement of the articles by the conveyor system in the single loop from the loading area past the radiation source to the unloading area, and disposing radiation shielding material relative to the conveyor system disposed in the single loop for preventing radiation from the source from reaching the loading and unloading areas.

33. A method as set forth in claim 32 wherein the conveyor system includes a process conveyor section, transport conveyor sections and a closing conveyor section.

34. A method as set forth in claim 32 wherein there is space within the single loop and space outside of the single loop and the radiation shielding material is disposed relative to the conveyor system, in the space within the single loop and in the space outside of the single loop, to prevent radiation from the radiation source from reaching the loading area and the unloading area.

35. A method as set forth in claim 34 wherein the articles have first and second sides and wherein the movement of the articles in the single loop is in a first path to provide for an irradiation of the first side of the articles by the radiation source and wherein the articles move in a second path within the single loop past the radiation source, after the movement of the articles in the first path in the single loop past the radiation source, to obtain an irradiation of the second side of the articles by the radiation source.

36. A method as set forth in claim 35 wherein radiation shielding material is additionally disposed within the single loop adjacent the second path to shield the loading and unloading areas from the radiation source.

37. A system as set forth in claim 34 wherein the radiation source is disposed in the space outside of the loop and extends into the space within the loop.

* * * * *

UNITED STATES PATENT AND TRADEMARK OFFICE

CERTIFICATE OF CORRECTION

PATENT NO. : 5,994,706

DATED : Nov. 30, 1999

INVENTOR(S) : John Thomas Allen, et al.

It is certified that error appears in the above-identified patent and that said Letters Patent is hereby corrected as shown below:

Title page, under "ABSTRACT",change "though", to read --through--.

Column 4, line 44, change "intensity", to read --velocity--.

Column 8, line 24, change "an", to read --a--.

Column 11, line 6, claim 4, after "system", add --,--.

Column 11, line 24, claim 4, after "sources:", delete "and".

UNITED STATES PATENT AND TRADEMARK OFFICE

CERTIFICATE OF CORRECTION

PATENT NO. : 5,994,706

DATED : Nov. 30, 1999

INVENTOR(S) : John Thomas Allen, et al.

It is certified that error appears in the above-identified patent and that said Letters Patent is hereby corrected as shown below:

Column 11, line 65, claim 8, after "system", add --,--.

UNITED STATES PATENT AND TRADEMARK OFFICE

CERTIFICATE OF CORRECTION

PATENT NO. : 5,994,706

DATED : Nov. 30, 1999

INVENTOR(S) : John Thomas Allen, et al.

It is certified that error appears in the above-identified patent and that said Letters Patent is hereby corrected as shown below:

Column 18, line 51. claim 37, change "34", to read --21--.

Signed and Sealed this

Seventh Day of November, 2000

Attest:

Q. TODD DICKINSON

*Attesting Officer*

*Director of Patents and Trademarks*